(12) United States Patent
Towle

(10) Patent No.: US 6,311,552 B1
(45) Date of Patent: Nov. 6, 2001

(54) GEAR POSITION SENSOR

(75) Inventor: Paul Towle, Wellesbourne (GB)

(73) Assignee: LuK Leamington Limited, Warwickshire (GB)

( * ) Notice: Subject to any disclaimer, the term of this patent is extended or adjusted under 35 U.S.C. 154(b) by 0 days.

(21) Appl. No.: 09/194,899

(22) PCT Filed: Apr. 7, 1997

(86) PCT No.: PCT/GB97/00969

§ 371 Date: Dec. 4, 1998

§ 102(e) Date: Dec. 4, 1998

(87) PCT Pub. No.: WO98/45625

PCT Pub. Date: Oct. 15, 1998

(51) Int. Cl.[7] ................................................. G01M 15/00
(52) U.S. Cl. ............................................................ 73/118.1
(58) Field of Search ............................. 73/117.2, 117.3, 73/118.1, 119 R

(56) References Cited

U.S. PATENT DOCUMENTS

| | | |
|---|---|---|
| 4,712,420 * | 12/1987 | Johansson et al. ................ 73/118.1 |
| 5,307,013 * | 4/1994 | Santos et al. . |
| 5,716,301 * | 2/1998 | Wild et al. . |
| 5,809,835 * | 9/1998 | Beim et al. . |

FOREIGN PATENT DOCUMENTS

| | | |
|---|---|---|
| 2 707 360 A1 | 1/1995 | (FR) . |
| 2311 570 A | 10/1997 | (GB) . |
| 91 11638 A | 8/1991 | (WO) . |

\* cited by examiner

Primary Examiner—Eric S. McCall
(74) Attorney, Agent, or Firm—Darby & Darby

(57) ABSTRACT

A gear position sensor arrangement to indicate which gear ratio has been engaged in a change speed mechanism. The arrangement includes an indicating formation (19) which is connected with a portion (11) of a ratio selector mechanism of the change speed mechanism which moves in a first linear sense (X) and in a second rotary sense (Y) during selection of each gear ratio, and a sensing formation in the form of a cam surface (28) of a cam (20) which is moved in a third linear sense (Z) as a result of the movement of the indicating formation in the first and second senses to provide an indication as to the currently engaged gear ratio of the change speed mechanism via a linear sensing probe (26).

15 Claims, 5 Drawing Sheets

| RATIO ENGAGED | NOMINAL CAM DISPLACEMENT | MAX CAM DISPLACEMENT | MIN CAM DISPLACEMENT |
|---|---|---|---|
| NEUTRAL | 37mm | 37.30mm | 36.70mm |
| FIRST/SECOND | 38.54mm | 39.05mm | 37.99mm |
| THIRD/FOURTH | 35.5mm | 36.09mm | 34.87mm |
| FIFTH | 33.01mm | 33.94mm | 32.06mm |
| REVERSE | 41.34mm | 42.00mm | 40.63mm | ns
GEAR POSITION SENSOR

This invention relates to a gear position sensor for providing an indication as to which gear ratio is currently engaged in a change speed mechanism of a motor vehicle.

Typically a motor vehicle change-speed mechanism has a plurality of gear ratios which are mutually exclusively engageable so that at any instant only one of the ratios can be engaged and these ratios are selected by a selection member which is moved both linearly and rotationally to engage each ratio.

It is an object of the present invention to provide a gear position sensor which will enable the operative ratio of such a change speed mechanism to be readily sensed.

According to one aspect of the invention there is provided a gear position sensor arrangement to indicate which one of a plurality of gear ratios has been engaged in a change speed mechanism, the arrangement comprising an indicating formation which is operatively connected with a portion of a ratio selector mechanism of the change speed mechanism which moves in a first linear sense and in a second rotary sense during selection of each gear ratio, and a sensing formation in the form of a cam surface which is moved in a third linear sense as a result of the movement of the indicating formation in said first and second senses to provide an indication as to the currently engaged gear ratio of the change speed mechanism.

In a preferred construction the sensing formation is in the form of a cam and moves a linear sensing probe of an associated electrical position sensor to provide the indication of the engaged gear ratio.

The cam may simply bear against the sensing probe or may be connected to the probe by a snap or other connection.

The cam may be linearly slideable in said third sense within a housing which extends through an aperture in the casing of the selector mechanism and which also supports the associated electrical position sensor.

Conveniently the cam and housing within which the cam linearly slides may have cooperating formations which prevent rotation of the cam within the housing.

Preferably the housing includes a mounting flange which is secured to the outside of the casing of the selector mechanism.

The cam and housing may conveniently be formed from plastics material.

In an alternative construction the electrical position sensor may have a portion which extends into said casing and from which the sensing probe projects, the cam having a hollow tubular portion which slides linearly in a telescoping manner in said third sense over the outside of part of said portion of the electrical position sensor which projects in to the casing.

Preferably the portion of the electrical position sensor and the telescoping tubular portion have interengaging formations which prevent relative rotation. Again these telescoping components may be formed from plastics material.

Several gear position sensor arrangements in accordance with the present invention will now be described, by way of example only, with reference to the accompanying drawings in which.

Figures 6, 7:
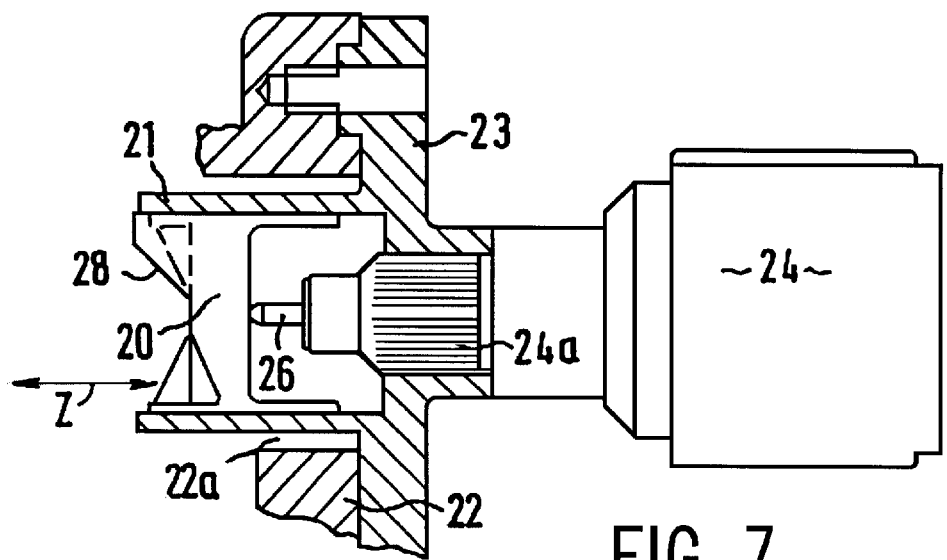
Figure 8:
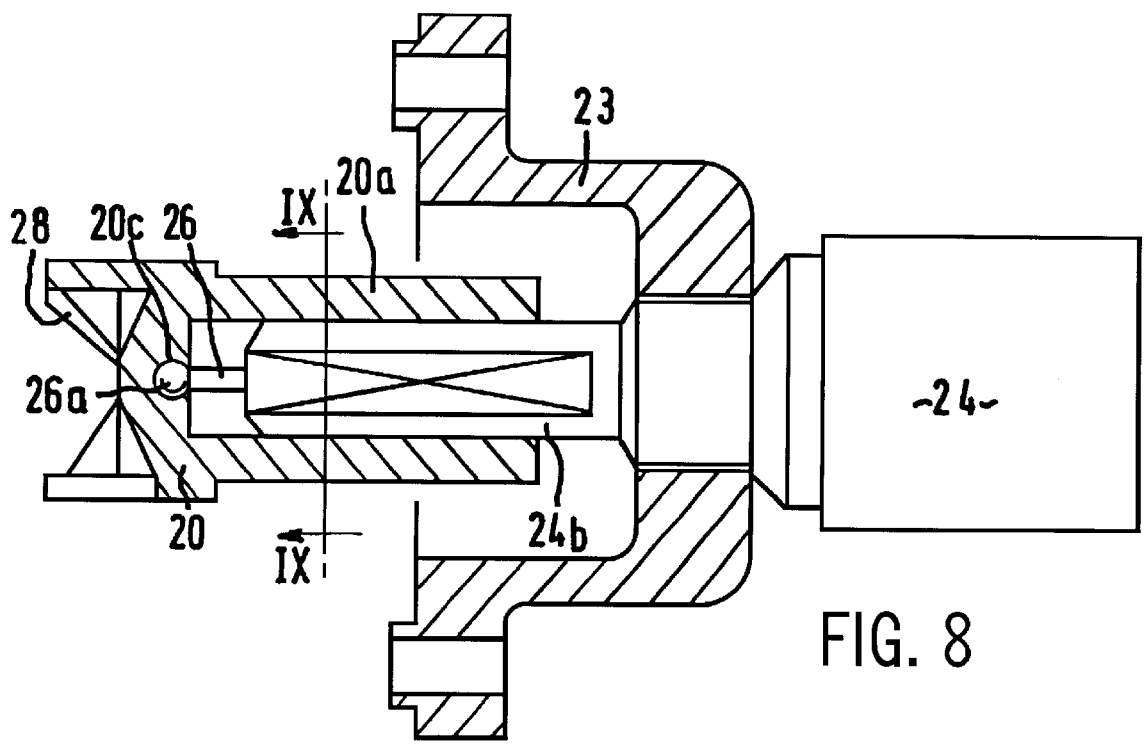
Figure 9:
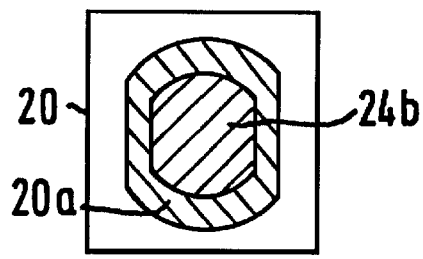

FIGS. 5*a* to 5*e* diagrammatically show the cam lifts associated with each ratio and the neutral condition of the associated change speed mechanism;

FIG. 6 shows in tabular form the ranges of cam displacement associated with each ratio;

FIG. 7 shows a modified form of the sensor arrangement shown in FIGS. 1 and 2, and FIGS. 8 and 9 show an alternative arrangement in which the sensing cam is not directly supported from the sensor mounting housing.

Figure 1:
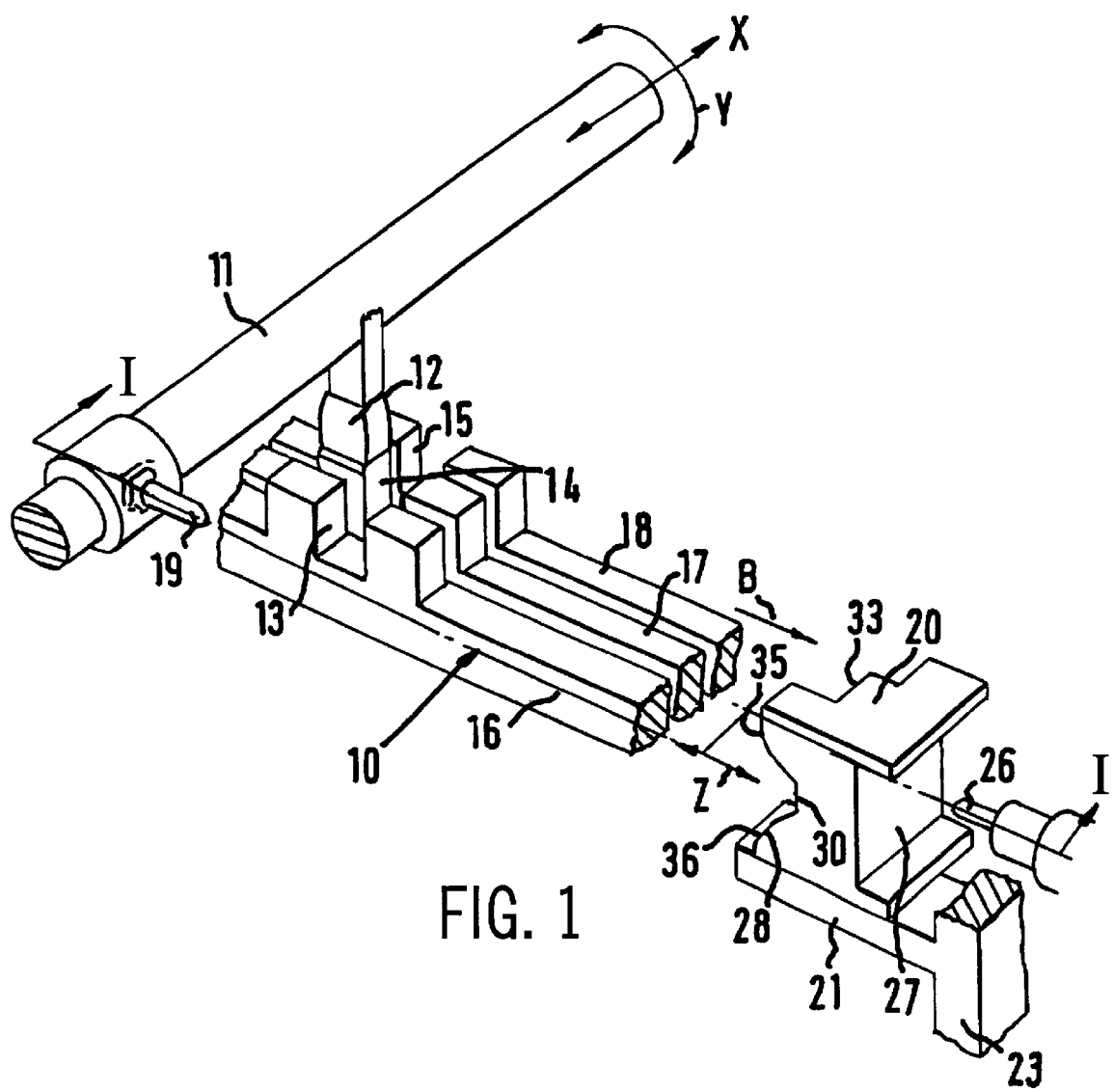
FIG. 1 is a diagrammatic exploded perspective view of a gear position sensor and part of an associated gear selector mechanism.
Figure 3:
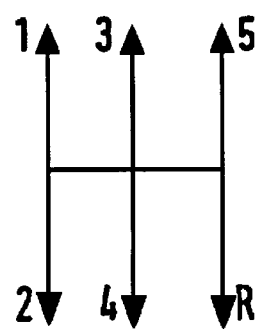
FIG. 3 shows the gear selection gate used by the selector mechanism shown in FIG. 1.
Figure 2:
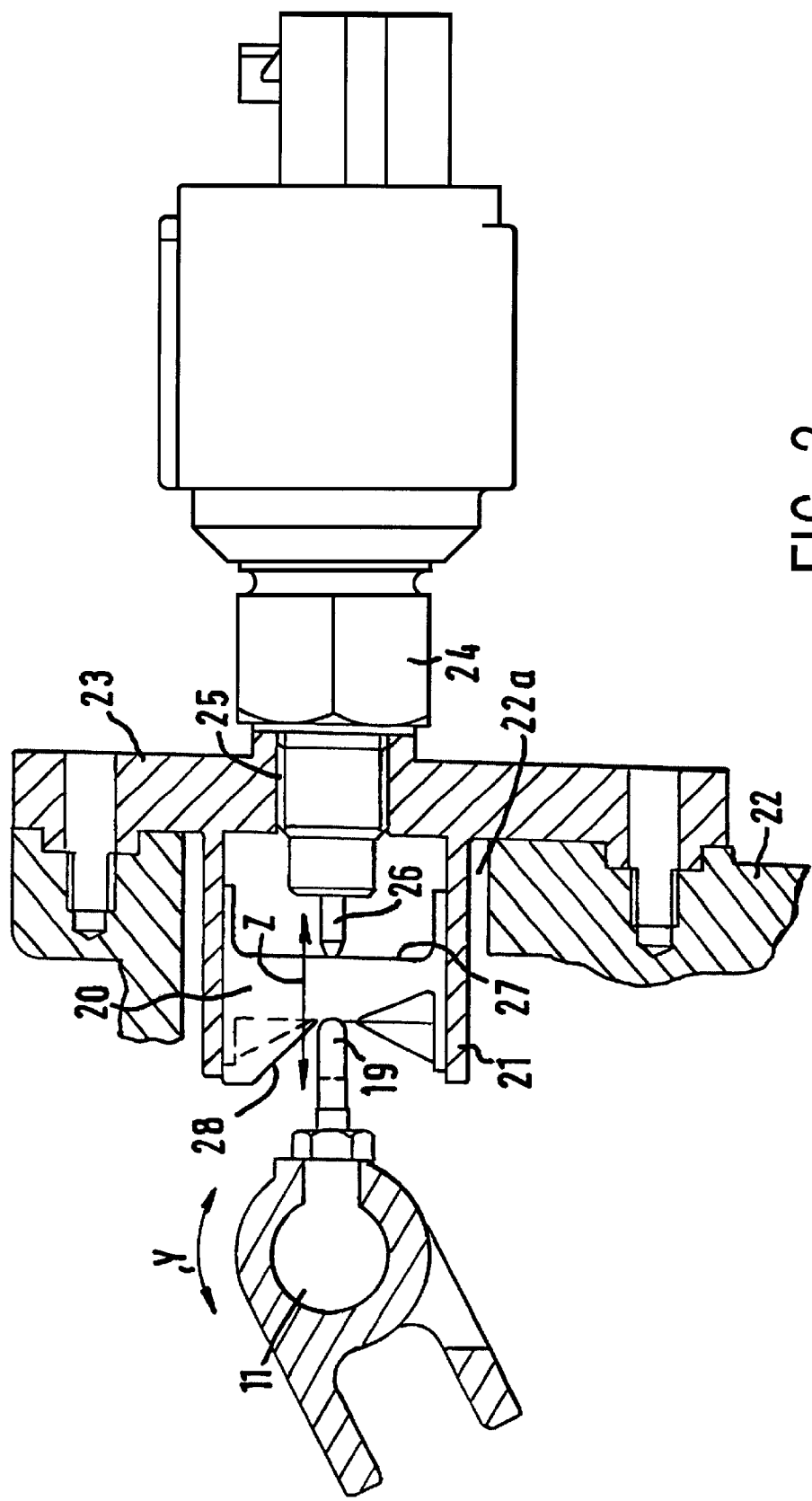
FIG. 2 is a sectional view on the line I–I of FIG. 1.

Referring to FIGS. 1 and 2 these show part of a ratio selection mechanism 10 for an associated vehicle change speed mechanism (not shown). The selection mechanism includes a shaft 11 which carries a ratio selecting finger 12 which is engageable with cut-outs 13, 14 and 15 associated with ratio selector rods 16, 17 and 18 respectively. In the known manner shaft 11 is displaced in a first axial sense X and also rotateable in sense Y in order to selectively engage with the respective ratio selector rods 16 to 18 on movement of an associated gear selector lever (not shown) within the ratio selection gate shown in FIG. 3.

The connection (not shown) between the gear selector lever and shaft 11 can be mechanical, electrical or hydraulic. For example, the gear lever may be connected with shaft 11 via a cable and a lever system.

Attached to shaft 11 is an indicating formation in the form of projection 19 which engages a sensing formation in the form of a cam 20 which is slideable in a plastics housing 21 which projects into a casing 22 which surrounds the selection mechanism via an aperture 22*a*. Housing 21 also includes an attachment flange 23 which extends outside the casing 22 and into which an electrical position sensor 24 is screwed at 25. Sensor 24 has a probe 26 which bears against the rear face 27 of cam 20 and follows the linear movement of cam 20 in sense Z in response to the linear and rotational movement of shaft 11 in senses X and Y respectively. The sensor 24 produces an electrical signal which varies with the axial position of probe 26 thus providing to an electrical control system an indication as to which gear ratio is currently engaged in the associated change speed mechanism. This electrical signal may then be used, for example, as part of a semi-automatic transmission of the kind disclosed in European Patents Nos 0038113, 0043660, 0059035 and 0101220 or as part of a fully automated transmission disclosed in, for example, UK patent application No. 95 02140.8.

Figure 4:
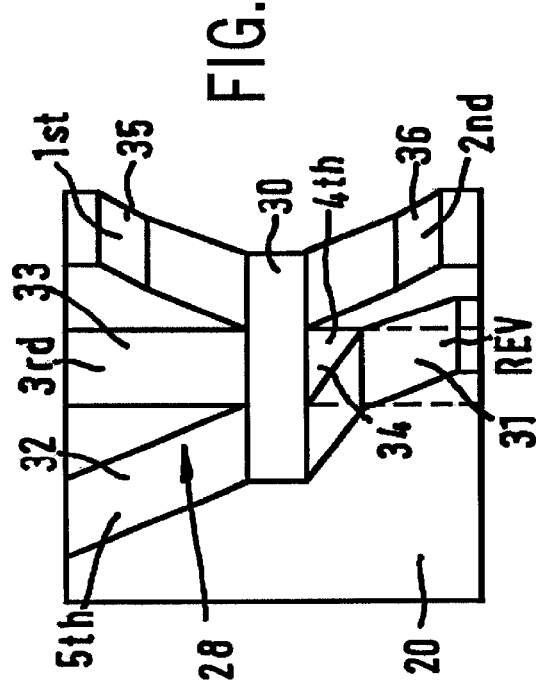
FIG. 4 shows the shape of the sensing cam used in the gear position sensor of FIG. 1 viewed in the direction of arrow B.

Referring to FIG. 4, this shows in detail the shape of the front face 28 of cam 20 which is contacted by projection 19. Cam surface 28 has a central track 30 along which projection 19 moves when the associated change speed mechanism is in its neutral condition. At one end and to one side of track 30 is provided a raised cam contact surface 31 which is engaged by the projection 19 when shaft 11 is moved to engage the reverse ratio of the associated change speed mechanism. To the other side of neutral track 30 is a lower cam contact surface 32 which is engaged when shaft 11 is moved to select the fifth ratio of the change speed mechanism. Moving axially towards the centre of track 30 cam contact areas 33 and 34 are provided either side of the neutral track which are engaged by projection 19 when shaft 11 is moved to engage the third and fourth ratios respectively of the change speed mechanism. These contact areas 33 and 34 are slightly below the general level of neutral track 30 of the cam surface 28.

Moving now to the other end of neutral track 30 two raised cam contact areas 35 and 36 are provided either side of the neutral track which are engaged by projection 19 when the first and second ratios of the change speed mechanism are engaged by movements of shaft 11.

Figures 5A, 5B, 5C, 5D, 5E:
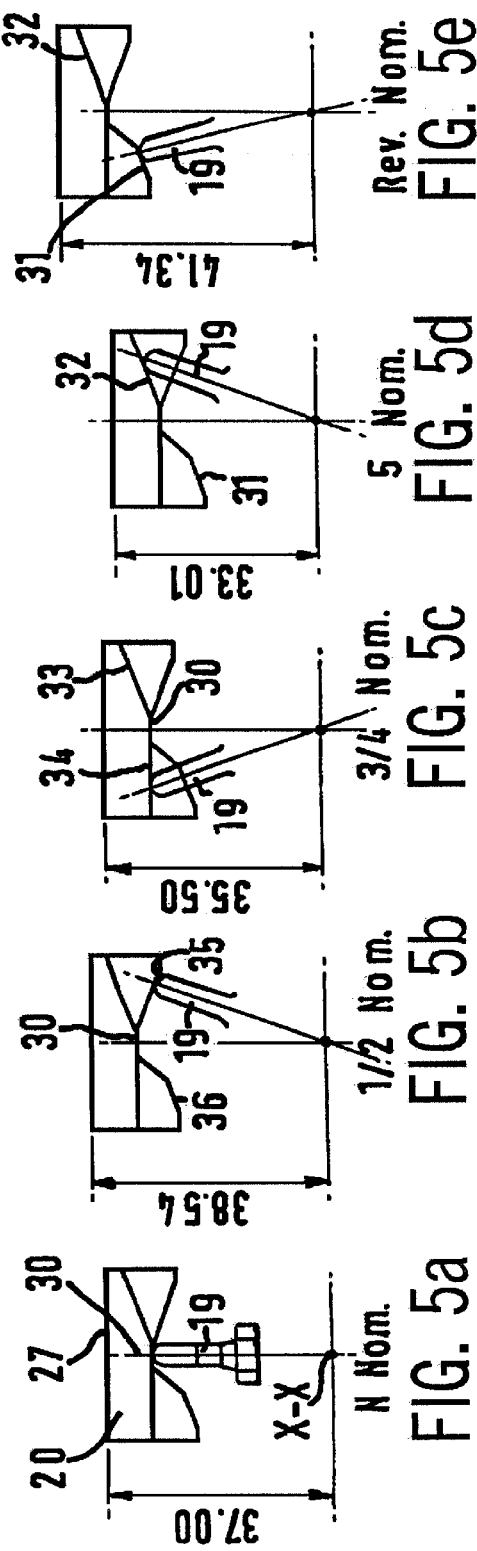

FIG. 5*a* shows the nominal displacement of the rear face 27 of cam 20 from the longitudinal axis X—X of shaft 11 when the probe 19 is engagement with the neutral track 30. Nominally this displacement is 37 mm (0.3 mm). Similarly FIGS. 5*b*, 5*c*, 5*d* and Be show the nominal displacement of the rear face 27 when the first/second, third/fourth, fifth and reverse ratios respectively are selected by the associated change speed mechanism. FIG. 6 shows in tabular form the nominal, maximum and minimum displacements associated with each ratio of the transmission. This defines the range of cam positions and thus electrical signals from the associated sensor 24 associated with each ratio.

As will be appreciated from the above the output signal from sensor 24 when projection 19 engages cam contact surface 35 or 36 to select either the first or second operative ratio will be the same. Similarly when projection 19 engages cam contact surface 33 or 34 to select third or fourth ratio the output from sensor 24 will be the same for both third and fourth ratios. In order for the associated electrical control system to be able to differentiate between first and second and third and fourth ratios the associated gear selector lever is provided with a movement sensor which indicates whether the vehicle operator is pulling or pushing on the gear lever and thus enables the overall system to differentiate between first and second gear selection and between third and fourth gear selection.

Alternatively, if the travel of probe 26 is sufficiently long, it may be possible, with a suitably amended cam surface 28, to have a unique axial position of probe 26 (which corresponds to a unique position of cam 20) for each gear ratio of the transmission thus making it unnecessary to also use a gear lever push/pull sensor to differentiate between first and second and between third and fourth gear as described above.

FIG. 7 shows a sensing arrangement similar to that shown in FIG. 2 with the exception that the sensor 24 has a splined portion 24a which is either cast into or permanently pressed into plastics housing 23.

In all the arrangements described above the probe 26 of sensor 24 simply bears against the rear face 27 of cam 20 and remains in contact with this surface as the cam moves in direction Z. In the arrangement shown in FIG. 8 the probe 26 has a terminal ball-shaped portion 26a which snaps into a corresponding ball shaped recess 20c in cam member 20 to ensure that the cam member and probe 26 move as a single unit. In the arrangement shown in FIGS. 8 and 9 the cam member 20 has a tubular portion 20a which is guided on nose portion 24b of sensor 24 and which takes no direct support whatsoever from the housing 23 which mounts sensor 24 on the selection mechanism casing. As can be seen from FIG. 9, the cross-section of nose portion 24b of sensor 24 and the surrounding tubular portion 20a of cam 20 co-operate to prevent rotation of cam member 20 about nose portion 24b when projection 19 moves during selection of the various ratios of the associated change speed mechanism.

The present invention thus provides a simple but efficient arrangement which not only mounts an electrical position sensor on a selection mechanism casing but also translates the linear and rotational movements of an associated ratio selection member into purely linear movements of a sensing probe of the position sensor.

What is claimed is:

1. A gear position arrangement to indicate which one of a plurality of gear ratios has been engaged in a change speed mechanism, the arrangement comprising:
   an indicating formation mounted for movement with a portion of a ratio selector mechanism, said indicating formation being in fixed axial end relationship to said portion;
   said portion of the ratio selector mechanism being movable linearly in a first direction and rotationally during selection of each gear ratio; and
   a sensing formation in the form of a cam surface which is engaged by the indicating formation and which is moved linearly in a second direction as a result of movement of the indicating formation linearly and rotationally with said portion of the ratio selector mechanism, such movement providing an indication as to the current engaged gear ratio in the change speed mechanism.

2. An arrangement according to claim 1 characterized in that the sensing formation is in the form of a cam and moves a linear sensing probe of an associated electrical position sensor to provide the indication of the engaged gear ratio.

3. An arrangement according to claim 2 characterized in that the cam simply bears against the sensing probe or is connected to the probe by a snap or other connection.

4. An arrangement according to claim 2 characterized in that the cam is linearly slideable in said second linear direction within a housing which extends through an aperture in a casing of the selector mechanism and which also supports the associated electrical position sensor.

5. An arrangement according to claim 4 characterized in that the cam and the housing within which the cam linearly slides have interchanging formations which prevent rotation of the cam within the housing.

6. An arrangement according to claim 4 characterized in that the housing includes a mounting flange which is secured to the outside of the casing of the selector mechanism.

7. An arrangement according to claim 4 characterized in that the cam and housing are formed from plastics material.

8. An arrangement according to claim 7 characterized in that the sensor is cast, pressed or screwed into a the plastics mounting flange.

9. An arrangement according to claim 2 characterized in that the electrical position sensor has a portion which extends into a casing and from which the sensing probe projects, the cam having a hollow tubular portion which slides linearly in a telescoping manner in said second direction over the outside of part of said portion of the electrical position sensor which projects into the casing.

10. An arrangement according to claim 9 characterized in that the portion of the electrical position sensor and the telescoping tubular portion have interengaging formations which prevent relative rotation.

11. An arrangement according to claim 10 characterized in that the telescoping components are formed from plastics material.

12. An arrangement according to claim 11 characterized in that the position sensor is cast, pressed or screwed into a mounting flange which is secured to the outside of the casing of the selector mechanism.

13. An arrangement according to claim 1 characterized in that the cam surface comprises a central track engaged by the indicating formation when the change speed mechanism is in neutral, and contact surfaces on either side of the central track which are respectively engaged by the indicating formation when in each ratio.

14. An arrangement according to claim 1 characterized in that the cam surface generates a different movement of the sensing formation for each gear ratio.

15. An arrangement according to claim 1 characterized in that the gear ratios are selected by the movement of a gear selector in a selection gate having a plurality of selection planes and the cam surface causes the sensing formation is move to the same position when gear ratios in the same plane of movement are selected, the arrangement differentiating between ratios in the same plane of selection by the provision of a gear selector sensor which senses in which direction the selector is moved.

* * * * *